United States Patent Office 3,317,530
Patented May 2, 1967

3,317,530
4-NITRO-5-HYDROXYPYRIDAZONES-(6) AND A PROCESS FOR THEIR PRODUCTION
Franz Reicheneder and Karl Dury, Ludwigshafen (Rhine), Germany, assignors to Badische Anilin- & Soda-Fabrik Aktiengesellschaft, Ludwigshafen (Rhine), Germany
No Drawing. Filed Feb. 5, 1964, Ser. No. 342,777
Claims priority, application Germany, Feb. 6, 1963, B 70,636
8 Claims. (Cl. 260—250)

This invention relates to a process for the production of new 4-nitro-5-hydroxypyridazones-(6).

It is an object of this invention to provide a process for the production of new 4-nitro-5-hydroxypyridazones-(6). Another object of the invention is to provide the new 4-nitro-5-hydroxypyridazones-(6) themselves.

We have found that 4-nitro-5-hydroxypyridazones-(6) having the formula:

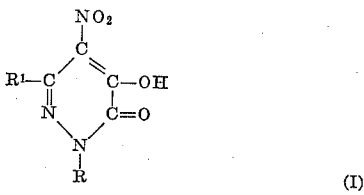

(I)

are obtained by reacting a 4,5-dihalopyridazone-(6) having the formula:

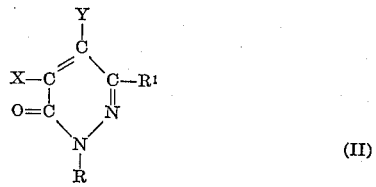

(II)

with a nitrite in the molar ratio of 1 to at least 3, if desired in the presence of a solvent and/or suspension agent. In the Formulae I and II, R denotes a hydrogen atom, a substituted or unsubstituted aliphatic, cycloaliphatic, araliphatic or aromatic radical, a sulfonyl radical of an alkylsulfonic acid or a sulfonyl radical of an arylsulfonic acid, and $R^1$ denotes a hydrogen atom, a halogen atom, an alkoxy radical or an aryl radical; X denotes a halogen atom and Y denotes a halogen atom. Preferred initial pyridazones-(6) of the Formula II are those in which the radical R denotes a hydrogen atom, an alkyl radical having one to eight carbon atoms, an alkyl radical having one to eight carbon atoms and bearing a hydroxy group, a cycloalkyl radical having five to twelve carbon atoms and which may be substituted with a hydroxy group, an aralkyl radical having seven to nine carbon atoms, an aryl radical having six to ten carbon atoms which may be substituted with a nitro group or halogen, or an arylsulfonyl radical having six to twelve carbon atoms, the radical $R^1$ denotes a hydrogen atom or an alkoxy group having one to four carbon atoms, X denotes chlorine or bromine and Y denotes chlorine or bromine. The radical R may bear as substituents one to three chlorine atoms, bromine atoms, hydroxy groups, nitro groups or alkoxy groups having one to four carbon atoms.

It is surprising that the two halogen atoms in 4- and 5-positions are eliminated simultaneously from the 4,5-dihalopyridazones-(6) by the action of a nitrite.

The 4,5-dihalopyridazones-(6) used as initial materials may be easily prepared for example by the method disclosed in German patent specification No. 1,086,238. For example 4,5-dichloropyridazone-(6),
1-methyl-4,5-dichloropyridazone-(6),
1-p-tosyl-4,5-dichloropyridazone-(6),
1-phenyl-4,5-dichloropyridazone-(6),
1-phenyl-4,5-dibromopyridazone-(6) and
1-cyclohexyl-4,5-dichloropyridazone-(6)

may be used as initial materials.

The nitrite may be used in the form of alkali metal or alkaline earth metal salts of nitrous acid, for example sodium nitrite, potassium nitrite or barium nitrite. Complex salts containing the nitrite ion in the molecule, as for example potassium mercury nitrite, may however be used for the reaction. Since three moles of nitrite is used up for each mole of pyridazone in the reaction, it is advantageous to add at least three moles of nitrite. An excess of nitrite, for example five to ten times the molar amount, may however be used.

The solvent and/or suspension agent, when used, may be water or an alcohol, for example methyl glycol, ethyl glycol, or ethylene glycol, carboxylic amides, such as dimethylformamide or N-methylpyrrolidone, nitriles, such as acetonitrile, or tertiary bases, such as pyridine, or picoline. Tetramethylurea, dimethylsulfoxide or tetramethylenesulfone are also suitable. The amount of solvent or suspension agent is not critical. It is used as a rule in 0.5 to 10 times the weight of the initial pyridazone.

To carry out the process, the 4,5-dihalopyridazone-(6) may be dissolved or suspended in the solvent or suspension agent and the nitrite which may be dissolved or suspended in the above-mentioned solvent is slowly added with stirring and simultaneous heating to about 50° to 180° C., advantageously to 90° to 130° C. When the bulk of the oxides of nitrogen formed has been disengaged, the reaction mixture may be further heated for some time under reflux. The product is cooled, and water and/or a mineral acid, for example dilute hydrochloric acid or sulfuric acid is added. The 4-nitro-5-hydroxypyridazones-(6) are thus deposited. In some cases it is advantageou after the heating and before the addition of water to concentrate the reaction mixture to about half its volume.

The 4-nitro-5-hydroxypyridazones-(6) obtainable are new compounds and are valuable substances for the production of dyes, plant protection agents and pharmaceuticals. The corresponding 4-amino - 5 - hydroxypyridazones-(6) are obtained by reduction of the nitro group with zinc and hydrochloric acid, analogously to the reduction of nitrobenzene to aniline, and these may be diazotized with nitrous acid. The diazo compounds are suitable as coupling components for the production of azo dyes and particularly for use in diazotype methods and in color photography by reason of their sensitivity to light.

The invention is further illustrated by the following examples. The parts given in the examples are parts by weight.

Example 1

12 parts of 1-phenyl-4,5-dichloropyridazone-(6) is dissolved in 50 parts of methyl glycol and 12 parts of sodium nitrite dissolved in 20 parts of water is slowly added at water-bath temperature. When the reaction, which proceeds with the escape of nitrogen oxides, has ceased, the whole is concentrated to about half its volume, diluted with water and acidified with dilute hydrochloric acid. Crude 1-phenyl-4-nitro-5-hydroxypyridazone-(6) is obtained which is recrystallized from acetonitrile. It has a melting point between 184° and 186° C. with decomposition. A deep cherry-red color is obtained with $FeCl_3$ in methanol.

$C_{10}H_7O_4N_3$ (233.18)—Calculated: C, 51.51%; H, 3.03%; N, 18.02%. Found: C, 51.8%; H, 3.2%; N, 17.35%.

The yield is 80% of the theory. 2 parts of 1-phenyl-4- hydroxy-5-chloropyridazone-(6) having a melting point of 264° C. is also formed. The ammonium salt may be prepared from 1-phenyl-4-nitro-5-hydroxypyridazone-(6) by dissolving it in excess dilute 2 N aqueous ammonia; the ammonium salt crystallizes out in the form of brilliant yellow needles having a melting point of 260° C. with decomposition.

$C_{10}H_{10}O_4N_4$ (250.21)—Calculated: C, 48.0%; H, 4.02%; O, 25.58%; N, 22.39%. Found: C, 48.3%; H, 4.2%; O, 24.8%; N, 22.6%.

By dissolving the nitrohydroxypyridazone in a little pyridine and diluting with water, the pyridinium salt is obtained as yellow needles having a melting point of 77° to 79° C.

$C_{15}H_{12}O_4N_4 \cdot \frac{1}{2}HO$—Calculated: N, 17.95%. Found: N, 17.45%.

By catalytic reduction with Raney nickel in methanol at 50° C. of 1-phenyl-4-nitro-5-hydroxypyridazone-(6) a quantitative yield of 1-phenyl-4-amino-5-hydroxypyridazone-(6) is obtained in the form of white needles having a melting point of 224° to 225° C.; this is identical with a sample which has been obtained by hydrogenation of 1-phenyl-4-diazo-5-oxopyridazone-(6).

$C_{10}H_9O_2N_3$ (203.20)—Calculated: C, 59.10%; H, 4.43%; O, 15.75%; N, 20.68%. Found: C, 59.6%; H, 4.43%; O, 15.75%; N, 20.7%.

*Example 2*

140 parts of sodium nitrite dissolved in 150 parts of water is slowly introduced at 105° C. into a solution of 140 parts of 1-phenyl-4,5-dichloropyridazone-(6) in 250 parts of dimethylformamide. After the reaction has ceased the whole is heated for another hour under reflux. The whole is cooled and diluted with water. The sodium salt of 1-phenyl-4-nitro-5-hydroxypyridazone-(6) is obtained. When recrystallized from methanol it forms bright yellow needles which melt at 311° C. with decomposition. By acidification with dilute hydrochloric acid, free 1-phenyl-4-nitro-5-hydroxypyridazone-(6) is obtained which gives a deep cherry-red color with FeCl₃ in methanol.

*Example 3*

20 parts of 1-phenyl-4,5-dibromopyridazone-(6) dissolved in 50 parts of dimethylformamide is reacted at water bath temperature with 10 parts of sodium nitrite dissolved in 15 parts of water. After the reaction has ceased, the whole is diluted with an equal volume of water and then acidified with 2 N hydrochloric acid. Crude 1-phenyl-4-nitro-5-hydroxypyridazone-(6) is obtained in almost quantitative yield.

*Example 4*

10 parts of 1-phenyl-4,5-dichloropyridazone-(6) dissolved in 150 parts of tetramethylurea has added to it at about 100° C. a solution of 12 parts of sodium nitrite in 20 parts of water and the whole is then kept at a bath temperature of about 120° C. for another hour. After cooling, the whole is diluted with water to about twice the volume and is acidified with 2 N hydrochloric acid. 6 parts of 1-phenyl-4-nitro-5-hydroxypyridazone-(6) is obtained.

*Example 5*

24 parts of 1-phenyl-4,5-dichloropyridazone-(6) dissolved in 200 parts of dimethylformamide is reacted with 28 parts of sodium nitrite in the way described in Example 1. The product is worked up and recrystallized from methanol. 17 parts of 1-phenyl-4-nitro-5-hydroxypyridazone-(6) is obtained.

*Example 6*

10 parts of 1-phenyl-4,5-dichloropyridazone-(6) is dissolved in 150 parts of dimethylformamide and reacted at water bath temperature with 12 parts of potassium nitrite in 20 parts of water. After working up as described in Example 1 and recrystallizing the product from methanol, 5.5 parts of 1-phenyl-4-nitro-5-hydroxypyridazone-(6) is obtained.

*Example 7*

100 parts of finely ground dry sodium nitrite is added in portions to 100 parts of 1-phenyl-4,5-dichloropyridazone-(6) dissloved in 200 parts of N-methylpyrrolidone so that the internal temperature does not exceed 120° C. Half an hour later the mixture is allowed to cool and diluted with water, whereupon 10 parts of unreacted 1-phenyl-4,5-dichloropyridazone-(6) is deposited and filtered off. The filtrate is acidified with dilute hydrochloric acid. 40 parts of 1-phenyl-4-nitro-5-hydroxypyridazone-(6) is obtained. After recrystallization from alcohol it melts at 183° to 185° C. with decomposition.

*Example 8*

In the way described in Example 1, 10 parts of 1-phenyl-4,5-dichloropyridazone-(6) is dissolved in 150 parts of dimethylformamide and reacted with 10 parts of the complex potassium mercury nitrite having the composition $K_3Hg(NO_2)_5 \cdot H_2O$ dissolved in 20 parts of water. By working up in conventional manner, 2 parts of 1-phenyl-4-nitro-5-hydroxypyridazone-(6) is obtained in addition to 5.1 parts of initial material.

*Example 9*

10 parts of 1-phenyl-4,5-dichloropyridazone-(6) is dissolved in 100 parts of pyridine and at 60° C. 10 parts of sodium nitrite in 20 parts of water is added. The reaction mixture is allowed to boil under reflux for two hours. After having been cooled, the whole is diluted with water, 6.5 parts of unchanged initial material is filtered off and the whole made weakly acid. 4 parts of crude pyridinium salt of 1-phenyl-4-nitro-5-hydroxypyridazone-(6) is thus deposited. It is identical with the salt described in Example 1. 1-phenyl-4-nitro-5-hydroxypyridazone-(6) is obtained by acidification with dilute hydrochloric acid.

*Example 10*

12 parts of barium nitrite in 20 parts of water is added at 75° C. to 10 parts of 1-phenyl-4,5-dichloropyridazone-(6) in 50 parts of dimethylformamide and the whole kept for one hour at 100° C. The whole is then diluted with water and the solution made acid to congo. 6 parts of 1-phenyl-4-nitro-5-hydroxypyridazone-(6) is obtained.

*Example 11*

10 parts of 1-phenyl-4,5-dichloropyridazone-(6) in 50 parts of ethylene glycol is reacted with 10 parts of sodium nitrite in 20 parts of water as described in Example 1. 7 parts of 1-phenyl-4-nitro-5-hydroxypyridazone-(6) is obtained by analogous working up.

*Example 12*

The procedure of Example 11 is followed but 50 parts of dimethylsulfoxide is used as solvent instead of ethylene glycol. 7.5 parts of 1-phenyl-4-nitro-5-hydroxypyridazone-(6) is obtained. The same result is achieved by using tetramethylenesulfone as solvent instead of dimethylsulfoxide.

*Example 13*

10 parts of sodium nitrite in 20 parts of water is added to 10 parts of 1-phenyl-4,5-dichloropyridazone-(6) in 50 parts of dimethylformamide and the whole is stirred for twelve hours at 50° to 60° C. 7 parts of 1-phenyl-4-nitro-5-hydroxypyridabine-(6) is obtained by working up.

*Example 14*

18 parts of 1-(p-chlorophenyl)-4,5-dichloropyridazone-(6) in 150 parts of dimethylformamide is boiled for one hour with 20 parts of sodium nitrite in 40 parts of water as described in Example 1. After working the product up, 11 parts of 1-(p-chlorophenyl)-4-nitro-5-hydroxypyridazone-(6) is obtained. When recrystallized from benzene it is obtained in the form of white platelets which melt at 140° to 142° C. The FeCl₃ reaction is strongly positive.

$C_{10}H_6O_4N_3Cl$ (267.5)—Calculated: C, 44.8%; H, 2.25%; O, 23.9%; N, 15.7%; Cl, 13.25%. Found: C, 44.9%; H, 2.6%; O, 23.7%; N, 15.7%; Cl, 12.8%.

Example 15

10 parts of 1-(p-tolyl)-4,5-dichloropyridazone-(6) in 60 parts of dimethylformamide is boiled under reflux with 10 parts of sodium nitrite in 20 parts of water for two hours.

By working up, 8 parts of crude crystalline 1-(p-tolyl)-4-nitro-5-hydroxypyridazone-(6) is obtained which, after having been recrystallized from methanol, and from ethyl acetate, melts at 190° C. with decomposition.

The solution becomes cherry-red in color with FeCl₃.

$C_{11}H_9O_4N_3$ (247.21)—Calculated: C, 53.44%; H, 3.67%; O, 25.89%; N, 17.00%. Found: C, 53.9%; H, 3.8%; O, 25.7%; N, 16.7%.

Example 16

20 parts of 1-(p-toluenesulfonyl)-4,5-dichloropyridazone-(6) in 100 parts of dimethylformamide is reacted with 20 parts of sodium nitrite in 35 parts of water at 75° to 90° C. for thirty minutes. The whole is diluted with water and 2 N hydrochloric acid. 15 parts of crude sodium salt of 1-(p-toluenesulfonyl)-4-nitro-5-hydroxypyridazone-(6) is obtained which decomposes at 190° C. after recrystallization from methanol.

$C_{11}H_8O_6N_3 \cdot Na$ (333)—Calculated: C, 39.65%; H, 2.4%; N, 12.6%; S, 9.61%; Found C, 39.9%; H, 2.8%; N, 11.6%; S, 9.2%.

When an aqueous solution of the sodium salt is allowed to flow into concentrated hydrochloric acid, white crystalline 1-(p-toluenesulfonyl)-4-nitro-5-hydroxypyridazone-(6) is obtained; when recrystallized from ethanol, it melts at 194° C. with decomposition.

$C_{11}H_9O_6N_3S$ (311.21)—Calculated: C, 42.45%; H, 2.92%; N, 13.50%; S, 10.25%. Found: C, 42.4%; H, 3.0%; N, 13.2%; S, 10.7%.

Example 17

3 parts of 1-(m-nitrophenyl)-4,5-dichloropyridazone-(6), dissolved in 20 parts of dimethylformamide, is reacted for fifteen minutes at 95° C. with 3 parts of sodium nitrite in 5 parts of water. The whole is diluted with water and made acid to congo. 2.5 parts of pale yellow colored crystals of 1-(m-nitrophenyl)-4-nitro-5-hydroxypyridazone-(6) is obtained. When recrystallized from methanol, the compound melts between 128° and 129° C.

$C_{10}H_6O_6N_4$ (278.18)—Calculated: C, 43.17%; H, 2.17%; O, 34.51%; N, 20.14%. Found: C, 43.1%; H, 2.7%; O, 32.8%; N, 20.2%.

Example 18

12 parts of sodium nitrite in 15 parts of water is added to 8 parts of 4,5-dichloropyridazone-(6) dissolved in 50 parts of water at water bath temperature. The mixture is then heated under reflux for another two and a half hours. The whole is cooled and acidified with dilute hydrochloric acid. 5 parts of crystalline 4-nitro-5-hydroxypyridazone-(6) is obtained which when recrystallized from methyl glycol has a melting point of 242° C. with decomposition.

$C_4H_3O_4N_3$ (157.09)—Calculated: C, 30.58%; H, 1.93%; N, 26.75%. Found: C, 30.87%; H, 2.02%; N, 26.33%.

By acetylation of this substance with acetic anhydride sulfuric acid, 4-nitro-5,6-diacetoxypyridazine is obtained which crystallizes from benzene in white platelets and melts at 150° to 151° C.

$C_8H_7N_3O_6$ (241.16)—Calculated: C, 39.84%; H, 2.93%; N, 17.43%. Found: C, 39.8%; H, 3.1%; N, 17.7%.

Example 19

30 parts of 4,5-dichloropyridazone-(6) dissolved in 150 parts of methylpyrrolidone is reacted with 45 parts of sodium nitrite in 50 parts of water as described in Example 18. 20 parts of 4-nitro-5-hydroxypyridazone-(6) which is identical with the product described in Example 18 is obtained.

Example 20

10 parts of 1-cyclohexyl-4,5-dichloropyridazone-(6) dissolved in 150 parts of dimethylformamide is reacted with 10 parts of sodium nitrite in 30 parts of water and then heated under reflux for two hours. The whole is cooled, diluted with water and acidified with 2 N hydrochloric acid. 8 parts of 1-cyclohexyl-4-nitro-5-hydroxypyridazone-(6) is obtained which when recrystallized from acetonitrile is obtained in the form of white needles melting between 190° and 192° C. with decomposition.

$C_{10}H_{13}O_4N_3$ (239.23)—Calculated: C, 50.20%; H, 5.48%; O, 26.75%; N, 17.57%. Found: C, 50.3%; H, 5.8%; O, 27.3%; N, 16.6%.

Example 21

50 parts of sodium nitrite dissolved in 50 parts of water is added to 50 parts of 1-methyl-4,5-dichloropyridazone-(6) dissolved in 100 parts of dimethylformamide and boiled under reflux for two hours. The whole is cooled, diluted with water to twice its volume and the solution cooled. 45 parts of the sodium salt of 1-methyl-4-nitro-5-hydroxypyridazone-(6) separates in the cold; it has a melting point of 345° C. with decomposition. The salt is dissolved in water and the solution is acidified. 1-methyl-4-nitro-5-hydroxypyridazone-(6) is precipitated. After it has been recrystallized twice from acetonitrile it has a melting point of 168° to 170° C. with decomposition. A deep cherry-red color is obtained by adding FeCl₃ to an aqueous solution of the compound.

$C_5H_5O_4N_3$ (171.11)—Calculated: C, 35.09%; H, 2.95%; O, 37.40%; N, 24.56%. Found: C, 35.4%; H, 2.8%; O, 36.9%; N, 24.8%.

Example 22

20 parts of sodium nitrite dissolved in 30 parts of water is added at water bath temperature to 20 parts of 1-(β-hydroxyethyl) - 4,5 - dichloropyridazone-(6) dissolved in 200 parts dimethylformamide. The mixture is boiled under reflux for two hours. The reaction mixture is then concentrated in vacuo to half its volume, the sodium chloride separated is filtered off and the filtrate is cooled by placing it in ice. 5 parts of the sodium salt of 1-(β-hydroxyethyl)-4-nitro - 5 - hydroxypyridazone-(6) is obtained which melts at 178° to 182° C. with decomposition. The sodium salt may be converted with hydrochloric acid into 1-(β-hydroxyethyl)-4-nitro-5-hydroxypyridazone-(6).

$C_6H_6O_5N_3Na$—Calculated: C, 32.3%; H, 2.69%; N, 18.85%. Found: C, 32.3%; H, 3.08%; N, 18.8%.

Example 23

20 parts of sodium nitrite dissolved in 20 parts of water is added to 20 parts of 1-(2'-chlorocyclohexyl)-4,5-dichloropyridazone-(6) in 50 parts of dimethylformamide and the mixture boiled for two hours under reflux. The whole is cooled and acidified with dilute hydrochloric acid. The oil which separates crystallizes when ground with methanol. When the product is recrystallized from acetonitrile, 8.5 parts of 1-(2'-hydroxycyclohexyl)-4-nitro-5-hydroxypyridazone-(6) is obtained as white needles which have a melting point of 223° to 225° C.

$C_{10}H_{13}O_5N_3$ (255.23)—Calculated: C, 47.06%; H, 5.23%; O, 31.34%; N, 16.47%. Found: C, 47.3%; H, 5.2%; O, 30.9%; N, 16.1%.

Example 24

5 parts of 1-methyl-3-methoxy-4,5-dichloropyridazone-(6) dissolved in 20 parts of dimethylformamide has added thereto 5 parts of sodium nitrite in 8 parts of water. The mixture is boiled for one hour under reflux. After it has been cooled, it is made acid to congo with half-concentrated hydrochloric acid. The whole is left to stand overnight in an ice-box. 4 parts of 1-methyl-3-methoxy-4-nitro-5-hydroxypyridazone-(6) is obtained in the form of pale yellowish needles. After having been recrystallized from benzene, the crystals melt at 176° to 178° C. with decomposition.

$C_6H_7O_5N_3$ (201.14)—Calculated: C, 35.83%; H, 3.51%; O, 39.77%; N, 20.89%. Found: C, 35.6%; H, 3.5%; O, 39.1%; N, 20.5%.

We claim:

1. A 4-nitro-5-hydroxypyridazone-(6) having the formula

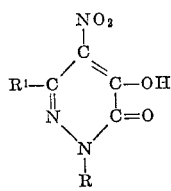

where R denotes a member selected from the group consisting of hydrogen, alkyl of one to eight carbon atoms, alkyl of one to eight carbon atoms substituted by a hydroxy group, cycloalkyl of five to twelve carbon atoms, cycloalkyl of five to twelve carbon atoms substituted by a hydroxy group, aralkyl of seven to nine carbon atoms, aryl of six to ten carbon atoms, aryl of six to ten carbon atoms substituted by a nitro group, aryl of six to ten carbon atoms subsituted by halogen, and arylsulfonyl of six to twelve carbon atoms, and $R^1$ denotes a member selected from the group consisting of hydrogen and alkoxy of one to four carbon atoms.

2. 1-phenyl-4-nitro-5-hydroxypyridazone-(6).
3. 1-(p-chlorophenyl)-4-nitro-5-hydroxypyridazone-(6).
4. 1-(p-tolulenesulfonyl)-4-nitro-5-hydroxypyridazone-(6).
5. 4-nitro-5-hydroxypyridazone-(6).
6. A process for the production of 4-nitro-5-hydroxypyridazone-(6) of the formula

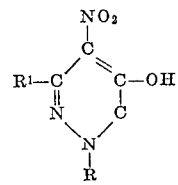

where $R^1$ denotes a member selected from the group consisting of hydrogen, alkyl of one to eight carbon atoms, alkyl of one to eight carbon atoms substituted by a hydroxy group, cycloalkyl of five to twelve carbon atoms, cycloalkyl of five to twelve carbon atoms substituted by a hydroxy group, aralkyl of seven to nine carbon atoms, aryl of six to ten carbon atoms, aryl of six to ten carbon atoms substituted by a nitro group, aryl of six to ten carbon atoms substituted by halogen, and arylsulfonyl of six to twelve carbon atoms, and R denotes a member selected from the group consisting of hydrogen and alkoxy of one to four carbon atoms, which comprises reacting a 4,5-dihalopyridazone-(6) having the formula

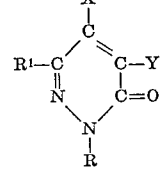

where R and $R^1$ have the meanings given above and X and Y each denotes halogen, with a nitrite in the molar ratio of one to at least three at a temperature between 50° and 180° C.

7. A process as claimed in claim 6 wherein the reaction is carried out in the presence of a solvent.
8. A process as claimed in claim 6 wherein the reaction is carried out at a temperature between 90° and 130° C.

No references cited.

NICHOLAS S. RIZZO, *Primary Examiner.*

UNITED STATES PATENT OFFICE
CERTIFICATE OF CORRECTION

Patent No. 3,317,530            May 2, 1967

Franz Reicheneder et al.

It is hereby certified that error appears in the above numbered patent requiring correction and that the said Letters Patent should read as corrected below.

Column 2, line 38, for "advantageou" read -- advantageous --; column 4, line 8, for "200 parts" read -- 300 parts --; line 68, for "hydroxypyridabine" read -- hydroxypyridazone --; column 8, lines 5 to 11, for that portion of the formula reading

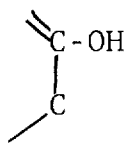      read      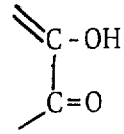

Signed and sealed this 16th day of July 1968.

(SEAL)
Attest:

Edward M. Fletcher, Jr.

Attesting Officer

EDWARD J. BRENNER

Commissioner of Patents